(12) United States Patent
Braun

(10) Patent No.: US 9,334,896 B2
(45) Date of Patent: May 10, 2016

(54) DRIVE SHAFT MODULE FOR A CONSTRUCTION MACHINE

(71) Applicant: JOSEPH VOEGELE AG, Ludwigshafen/Rhein (DE)

(72) Inventor: Arthur Braun, Deidesheim (DE)

(73) Assignee: JOSEPH VOEGELE AG (DE)

( * ) Notice: Subject to any disclaimer, the term of this patent is extended or adjusted under 35 U.S.C. 154(b) by 0 days.

(21) Appl. No.: 14/186,347

(22) Filed: Feb. 21, 2014

(65) Prior Publication Data

US 2014/0238827 A1 Aug. 28, 2014

(30) Foreign Application Priority Data

Feb. 22, 2013 (EP) ................................. 13000899

(51) Int. Cl.

| B65G 23/06 | (2006.01) |
|---|---|
| F16C 3/02 | (2006.01) |
| B65G 21/10 | (2006.01) |
| B65G 15/60 | (2006.01) |
| E01C 19/48 | (2006.01) |

(52) U.S. Cl.
CPC . *F16C 3/02* (2013.01); *B65G 15/60* (2013.01); *B65G 21/105* (2013.01); *B65G 23/06* (2013.01); *E01C 19/48* (2013.01)

(58) Field of Classification Search
CPC ...... B65G 15/60; B65G 21/105; B65G 23/06; F16C 3/02; F16C 3/023; E01C 19/48
USPC ......... 198/832, 833, 834, 835, 861.1, 781.09, 198/790

See application file for complete search history.

(56) References Cited

U.S. PATENT DOCUMENTS

| 3,015,258 A | 1/1962 | Apel et al. | |
|---|---|---|---|
| 3,213,703 A * | 10/1965 | Fitzgerald | ............... F16H 57/05 198/834 |
| 3,270,633 A | 9/1966 | Holland | |
| 3,360,107 A * | 12/1967 | Lockwood | ............. B65G 23/00 198/735.2 |
| 3,443,680 A * | 5/1969 | Brill | ....................... B65G 23/08 198/733 |
| 3,577,746 A * | 5/1971 | Dolan | ....................... F16D 3/06 464/16 |
| 3,967,912 A | 7/1976 | Parker | |
| 4,037,713 A * | 7/1977 | Soliman | ................ E21F 13/068 198/725 |

(Continued)

FOREIGN PATENT DOCUMENTS

| DE | 29915798 U1 | 3/2000 |
|---|---|---|
| DE | 102006016099 A1 | 10/2007 |

(Continued)

OTHER PUBLICATIONS

European Search Report Dated Jun. 26, 2013, Application No. 13000899.8-1707, Applicant Joseph Voegele AG, 6 Pages.

(Continued)

*Primary Examiner* — Leslie A Nicholson, III
*Assistant Examiner* — Keith R Campbell
(74) *Attorney, Agent, or Firm* — Brooks Kushman P.C.

(57) ABSTRACT

A drive shaft module for a material conveyor system of a construction machine comprises a drive shaft and at least one first mounting which is designed to hold the drive shaft at at least one first bearing location. The drive shaft comprises different segments which are joined by friction welding, and the mounting is connected to the drive shaft such that the complete drive shaft module may be detachably fixed, in a preassembled state, in or at the construction machine.

15 Claims, 3 Drawing Sheets

(56) References Cited

U.S. PATENT DOCUMENTS

| | | | | |
|---|---|---|---|---|
| 4,049,112 A * | 9/1977 | Tyslauk | ............... | B65G 23/06 |
| | | | | 198/728 |
| 4,429,782 A | 2/1984 | Pierson | | |
| 4,437,564 A * | 3/1984 | Redder | ............... | B65G 23/06 |
| | | | | 198/834 |
| 4,772,156 A | 9/1988 | Craig | | |
| 5,105,936 A * | 4/1992 | Stapper | ............... | B65G 23/22 |
| | | | | 198/832 |
| 5,232,068 A * | 8/1993 | Bandy, Jr. | ............. | B65G 45/04 |
| | | | | 184/12 |
| 5,279,501 A | 1/1994 | Shelley | | |
| 5,927,479 A * | 7/1999 | Merten | ............... | B65G 23/06 |
| | | | | 198/834 |
| 5,947,265 A * | 9/1999 | Merten | ............... | B65G 23/06 |
| | | | | 198/834 |
| 5,980,153 A | 11/1999 | Plemons et al. | | |
| 6,064,030 A | 5/2000 | Sato | | |
| 6,227,354 B1 * | 5/2001 | Howden | ............... | B65G 23/06 |
| | | | | 198/834 |
| 6,279,734 B1 * | 8/2001 | Meya | ................... | B65G 23/06 |
| | | | | 198/834 |
| 6,390,283 B1 | 5/2002 | Goodwin | | |
| 6,607,074 B2 * | 8/2003 | Klabisch | ............... | B65G 23/06 |
| | | | | 198/834 |
| 7,128,201 B2 * | 10/2006 | Jones | ........................... | 198/834 |
| 7,207,435 B2 * | 4/2007 | Bude | ..................... | B65G 15/62 |
| | | | | 198/615 |
| 7,549,531 B2 * | 6/2009 | Hosch | .................... | B65G 23/06 |
| | | | | 198/834 |
| 7,673,741 B2 * | 3/2010 | Nemedi | ............. | B65G 21/105 |
| | | | | 198/493 |
| 8,021,078 B2 | 9/2011 | Lamb | | |
| 8,042,682 B2 * | 10/2011 | Ertel | ..................... | B65G 15/42 |
| | | | | 198/834 |
| 8,474,605 B2 * | 7/2013 | Lauwers | ............... | E21F 13/068 |
| | | | | 198/834 |
| 8,490,779 B2 * | 7/2013 | Schurer | ................. | B65G 23/06 |
| | | | | 198/834 |
| 8,646,593 B2 | 2/2014 | Andersson et al. | | |
| 8,833,202 B2 | 9/2014 | Tateno | | |
| 2013/0043107 A1 | 2/2013 | Shah | | |
| 2014/0027247 A1 * | 1/2014 | Cox | .................... | A01D 75/182 |
| | | | | 192/56.1 |

FOREIGN PATENT DOCUMENTS

| | | | |
|---|---|---|---|
| JP | 61068013 U | | 5/1986 |
| JP | 04231505 A | | 8/1992 |
| JP | 08035751 A | | 2/1996 |
| JP | 08035751 | * | 6/1996 |
| JP | 09025644 A | | 1/1997 |
| JP | 09302612 A | | 11/1997 |
| JP | 11322040 A | | 11/1999 |
| JP | 3382366 B2 | | 3/2003 |
| JP | 2003329051 A | | 11/2003 |
| JP | 2004308751 A | | 11/2004 |
| JP | 2004316859 A | | 11/2004 |
| JP | 3601798 B2 | | 12/2004 |
| JP | 2011153516 A | | 8/2011 |
| JP | 2012002383 A | | 1/2012 |
| WO | 2012090300 A1 | | 7/2012 |

OTHER PUBLICATIONS

European Search Report Dated Jul. 1, 2013, Application No. 13000906.1-1707, Applicant Joseph Voegele AG, 7 Pages.
Wikipedia entry on "Frition Welding" (http://en.wikipedia.org/w/index.php?title=Friction_welding&oldid=475165617) published as it existed on Feb. 5, 2012, 3 Pages.
Office Action Dated Sep. 22, 2014, U.S. Appl. No. 14/186,354, filed Feb. 21, 2014, 7 Pages.
Japanese Office Action Dated Feb. 17, 2015, Application No. 2014-020525, Reference No. GM1401010, Dispatch No. 070253, 3 Pages.
Japanese Office Action Dated Feb. 10, 2015, Application No. 2014-020521, Reference No. GM1401003, Dispatch No. 063490, 5 Pages.
Final Office Action Dated Jan. 9, 2015, U.S. Appl. No. 14/186,354, filed Feb. 21, 2014, 8 Pages.
Office Action Dated Jun. 9, 2015, U.S. Appl. No. 14/186,354, filed Feb. 21, 2014, 18 Pages.
Chinese First Office Action Dated Aug. 4, 2015, Application No. 201410062804.4, Applicant Joseph Fu Gele Company, 5 Pages.
Japanese Office Action Dated Aug. 18, 2015, Application No. 2014-020535, 3 Pages.
US Notice of Allowance Dated Sep. 10, 2015, U.S. Appl. No. 14/186,354, 17 Pages.
"Friction Welding Vehicle Drive Shafts", YouTube Video Uploaded by Thompson Friction Welding Ltd. on Oct. 14, 2008, https://www.youtube.com/watch?v=uURIXuUt5-k&feature=youtu.be., 2 Pages, and video viewable online at https://www.youtube.com/watch?v=uURIXuUt5-k.
"Inertia Friction Welding Demonstration—Manufacturing Technology, Inc.", YouTube Video Uploaded by Manufacturing Technology, Inc. on Jan. 18, 2009, https://www.youtube.com/watch?v=-aEuAK8bsQg&feature=youtu.be., 3 Pages, and video viewable online at https://www.youtube.com/watch?v=-aEuAK8bsQg.
Wikipedia page "Friction Welding", Dated Jan. 20, 2013, https:/en.wikipedia.org/w/index.php?title=Friction_welding &oldid=534022948, 3 Pages.
Article from Pavement Interactive "Viscosity Grading", Dated Aug. 16, 2007, http://www.pavementinteractive.org/article/viscosity-grading/, 2 Pages.
Article from Pavement Interactive "Gradation and Size", Dated Jun. 5, 2009, http://www.pavementinteractive.org/article/gradation-and-size/, 4 Pages.
Article from Pavement Interactive "Ashphalt Paver", Dated Apr. 7, 2009, http://www.pavementinteractive.org/article/asphalt-paver/, 5 Pages.
Matthew Reckard, P.E. & John Reyer, P.E., Asphalt Pavement Inspector's Manual, Alaska Department of Transportation and Public Facilities, Jul. 2002, Third Edition, 170 Pages.
Brochure: Volvo Tracked Pavers P7820C ABG, P8820C ABG, published by Volvo Construction Equipment 2012, 16 Pages.
Brochure: Dynapac Large Wheeled Paver Range, Dynapac SD2500W/SD2500WS, Dynapac GmbH (No Date Provided),16 Pages.
Article from Project Scotland website "Stirling Company Gets First Paving Machine of its Kind in Scotland", http://www.projectscot.com/2012/12/stirling-company-gets-first-pavi . . . , Dated Dec. 2012, 4 Pages.
Notice of Opposition to European Patent No. 2 769 939 B1, European Patent Application No. 13000906.1, Applicant Joseph Vögele AG, Opponent: Caterpillar, Inc., Dated Dec. 29, 2015, 20 Pages.

* cited by examiner

DRIVE SHAFT MODULE FOR A CONSTRUCTION MACHINE

CROSS-REFERENCE TO RELATED APPLICATIONS

This application claims foreign priority benefits under 35 U.S.C. §119(a)-(d) to European patent application number EP 13000899.8, filed Feb. 22, 2013, which is incorporated by reference in its entirety.

TECHNICAL FIELD

The disclosure relates to a drive shaft module and to a material conveyor system and a construction machine in which it is employed.

BACKGROUND

Drive shafts are employed in material conveyor systems of construction machines for power and moment transmissions. In conventional shafts, force application and bearing elements, e.g., gearwheels, belt disks, plain or rolling bearings, are fixed to the shaft using different shaft-hub connections. These include, for example, splined shaft gearing, force fits, or key-and-slot joints. These shaft-hub connections cause high manufacturing and assembly costs and efforts. For repairs as well, this conventional configuration requires high efforts for replacement procedures. Moreover, a certain relative motion between the shaft and the hub can never be completely avoided, causing a disadvantageous effect on the wear of the shaft.

For example from DE 10 2006 016 099 A1, gearbox shafts are known where the gearings are not applied using shaft-hub connections but provided as shaft sections which are axially connected to further shaft sections by friction welding. While this configuration facilitates assembly and the manufacture of the shaft itself, it does not facilitate the installation and replacement procedures.

SUMMARY

It is therefore an object of the disclosure to provide a drive shaft module of which the design is improved in the simplest possible way, in order to reduce both the manufacturing and assembly efforts/costs and those for installation and replacement.

The drive shaft module according to the disclosure is characterized in that a drive shaft contained therein comprises different segments which are joined by friction welding. Moreover, a mounting is provided which is connected to the drive shaft in such a way that the complete drive shaft module may be detachably fixed, in a preassembled state, in or at the construction machine. The advantage of this configuration is that the drive shaft module may be completely assembled, so that thereafter it merely has to be inserted into a receiving construction machine or a receiving material conveyor system and be fixed at the mounting. This represents a significant reduction in the installation efforts compared to prior art. The manufacture of the drive shaft from several segments joined by friction welding offers several advantages. On the one hand, only the fixed connection permits the above-described embodiment of the drive shaft module. On the other hand, the manufacturing efforts for the drive shaft itself are also reduced. Since the different shaft segments are connected to each other by friction welding, no more complex shaft-hub connections, such as splined shafts, force fits, or else key-and-slot joints, are necessary. In addition, joining by friction welding makes it possible to manufacture the individual segments from different materials. These may be optimized towards the function of the respective segment and differ with respect to hardness, surface hardness, density, weight, costs or corrosion and oxidation tendencies.

It may be advantageous for the drive shaft module to comprise at least one further mounting which is also connected to the drive shaft such that the complete drive shaft module may be detachably fixed, in a pre-assembled state, in or at the construction machine. This may increase the stability of the shaft support without any essential additional assembly efforts.

It is suitable for the first mounting and/or the further mounting or the further mountings to each comprise a bearing arm. Such a bearing arm may increase the flexibility of the arrangement and facilitate assembly.

It is particularly advantageous for the drive shaft module to comprise, in addition to the mounting or the mountings, a device which is configured for a pluggable connection of the drive shaft module with a corresponding disposition of the construction machine. This may further facilitate assembly.

It proved to be advantageous to design the drive shaft as a hollow shaft. Thus, joining by friction welding may be facilitated. Moreover, weight may be decreased in this manner.

It is particularly advantageous to provide a lubrication device within the drive shaft designed as a hollow shaft. Thereby, the distribution of the lubricant may be facilitated and supported by the rotation of the drive shaft. If a liquid lubricant is used, it might additionally flush potential abrasion products out of the region of the drive shaft module.

It may be suitable to fill the drive shaft designed as hollow shaft with lubricant. This represents a variant of lubrication that may be particularly easily realized.

The disclosure also relates to a material conveyor system for a construction machine that processes or transports bulk material. Such a material conveyor system comprises one conveyor or several conveyors which are configured to convey the bulk material, and one or several drive shaft modules of the type described above configured to drive the conveyor or the conveyors. The use of such a drive shaft module offers the advantage that assembly efforts are reduced both for the installation and for repair or maintenance. This may minimize downtimes of the material conveyor system or the construction machine.

It proved to be suitable for the drive shaft module or the drive shaft modules to be removable at an angle, preferably orthogonally to the conveying direction of the respective conveyor.

If several conveyors are provided, it is particularly advantageous for the drive shaft modules to be removable each in one removing direction, and the removing direction of the respective drive shaft module of one conveyor points into a direction facing away from another conveyor. This significantly facilitates removal, e.g., in scraper belts that run closely one next to the other, since the respective adjacent conveyor does not stand in the way.

In one variant of the disclosure, the conveyor of the material conveyor system may be a scraper belt, or the conveyors may be scraper belts. Such scraper belts are often employed, for example, in road finishing machines for conveying bituminous mixed materials. Their use as conveyor in construction machines has proved its worth in years of practice.

It is moreover conceivable that the material conveyor system furthermore comprises a force transmission element designed to drive the drive shaft. This may be, for example, a chain, or different types of belts. This may further reduce dismounting efforts since such a configuration may normally be dismantled more easily than if the drive shaft was driven directly by a motor or the like.

It is particularly advantageous for the first mounting and the force transmission element to be associated with the same end of the drive shaft. In this manner, the access from one side of the material conveyor system is sufficient for replacing the drive shaft module.

The disclosure also relates to a construction machine for processing or transporting bulk material comprising a material conveyor system of the type described above.

Such a construction machine may be a road finishing machine or a feeder.

It is conceivable that the material conveyor system may be employed in the construction machine as a transverse conveyor system or as a longitudinal conveyor system.

Below, an advantageous embodiment of the disclosure will be illustrated in more detail with reference to the attached drawings.

DETAILED DESCRIPTION

Figure 1:
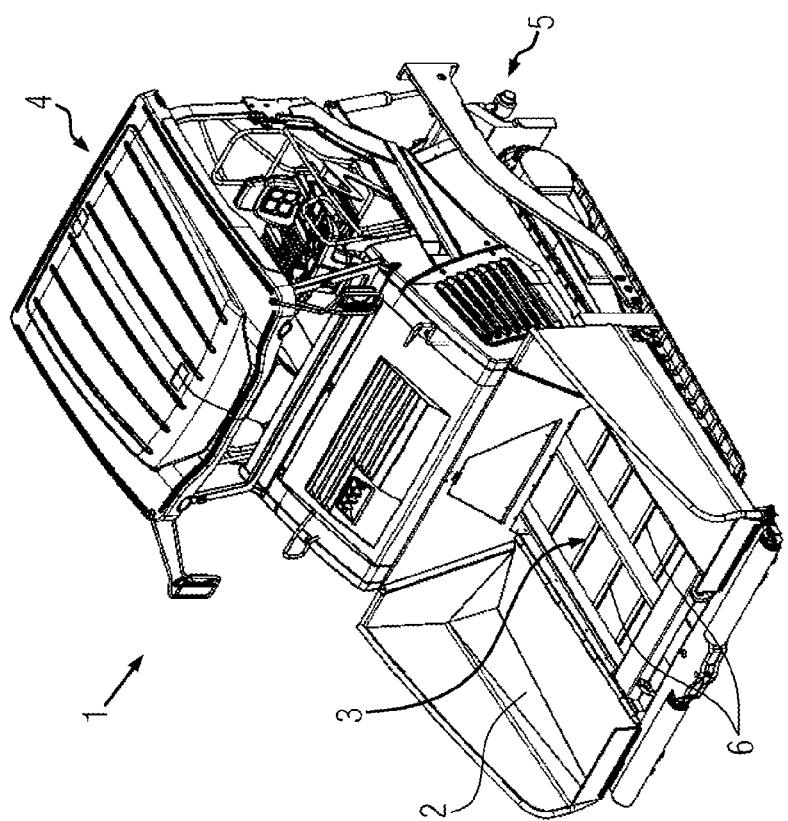
FIG. 1 shows a construction machine, in this case a road finishing machine, in which a material conveyor system according to the disclosure and a drive shaft module according to the disclosure are installed.

FIG. 1 shows a construction machine 1, in this embodiment a road finishing machine. In the front in the direction of travel, a material hopper 2 is arranged in which the bulk material processed by the construction machine 1 may be placed. In the concrete embodiment in which the construction machine 1 is a road finishing machine, the material will normally be bituminous mixed materials that are used in road construction. However, the machine may be any desired machine that transports or processes bulk material and may transport and/or process any kind of bulk material, for example sand, gravel or chips.

In the concrete embodiment, the bulk material to be processed is conveyed from the material hopper 2 through a material conveyor system 3 underneath a driver's cabin 4 to the installation site. There, it is distributed transversely to the direction of travel by a further material conveyor system 5. This is therefore also referred to as a transverse conveyor system. In this case, it is a system that employs conveyor screws. The following description of an embodiment of the disclosure is focused on the embodiment in the first material conveyor system 3. However, the disclosure may be applied to all material conveyor systems 3, 5 of the construction machine 1.

Figure 2:
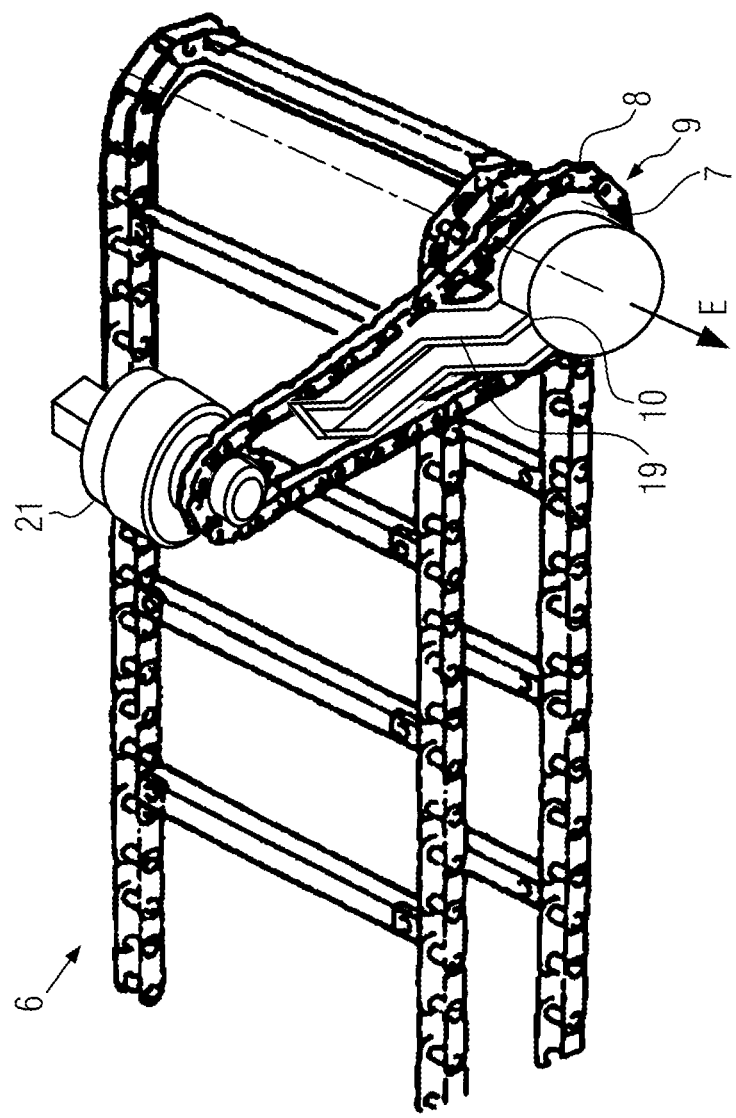
FIG. 2 shows a conveyor of a material conveyor system according to the disclosure, which, in the illustrated embodiment, is a scraper belt that is driven by means of a drive shaft module according to the disclosure.

FIG. 2 shows a conveyor 6 of the material conveyor system 3. In the current embodiment, the material conveyor system 3 is a longitudinal conveyor system. Scraper belts are used, as is often the case in longitudinal conveyor systems of road finishing machines. However, it is also possible to use embodiments according to the disclosure in other conveyors that are driven by drive shafts. In the described embodiment, moreover two conveyors 6 are employed, for example two scraper belts in parallel one next to the other. However, it is also possible to only provide one or more than two conveyors 6. The conveyor 6 is driven by a drive shaft 7 (here only partially seen). The drive shaft 7 itself is in turn driven by a force transmission element 8, in the shown example a chain, which is in turn driven by any kind of motor 21, for example an electric motor or a hydraulic motor. The drive shaft 7 is held by a mounting 10 at a first bearing location 9. The bearing location 9 may be the single bearing location of the drive shaft 7. It is, however, just as well possible to provide further bearing locations.

Figure 3:
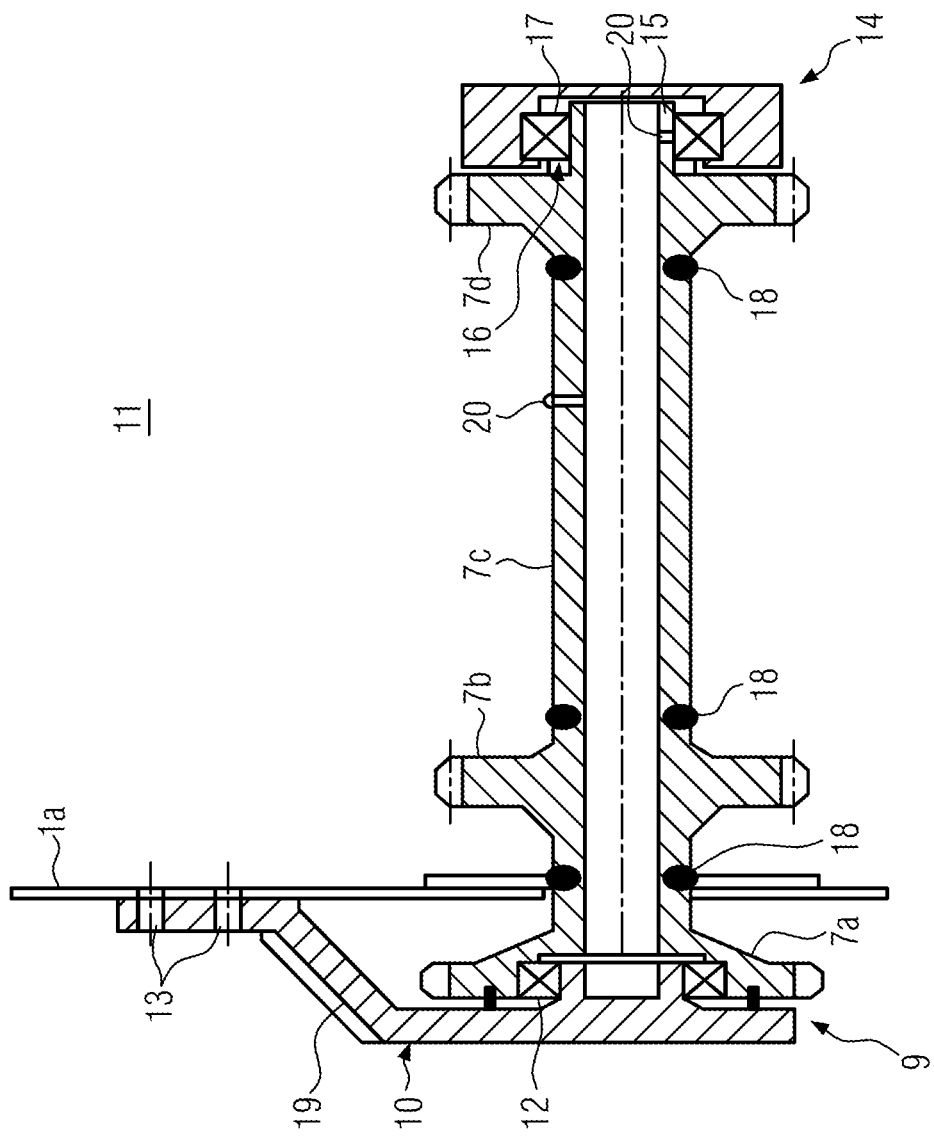
FIG. 3 shows a sectional view of a drive shaft module according to the disclosure.

Both the drive shaft 7 and the mounting 10 are parts of a drive shaft module 11 which will be illustrated below more in detail with reference to FIG. 3. There, the drive shaft 7 for the conveyor 6 is shown and comprises segments 7a, 7b, 7c and 7d as will be illustrated later. It is held at the first bearing location 9 by the mounting 10. The drive shaft 7 and the mounting 10 are connected to each other via a first rolling bearing 12 such that the complete drive shaft module 11 may be detachably fixed, in a preassembled state, in or at the construction machine 1. For this, for example bolting points 13 may be provided at the mounting for screwing it to a chassis 1a of the construction machine. However, any other connection that is detachable without destructing is conceivable. For the connection between the mounting 10 and the drive shaft 7, different variants are conceivable. In the embodiment shown in FIG. 3, for example the rolling bearing 12 is shrunk onto the mounting 10 and glued into the drive shaft 7. However, any other types of connection, in particular screwed joints, are also possible.

In the shown embodiment, the drive shaft 7 is additionally mounted at a second bearing location 14. No further mounting 10 is provided here, although it would be possible. Instead, the drive shaft 7 has a device 15 at the second bearing location 14 which is configured for a pluggable connection 16 with a corresponding disposition 17 of the construction machine 1, for example a second rolling bearing. For removing or replacing the drive shaft module 11, the mounting 10 must thus only be released at the bolting points 13 and the drive shaft module 11 pulled out of the pluggable connection 16 perpendicularly to the conveying direction of the conveyor 6 which is directed into the plane of projection.

As mentioned, the drive shaft 7 comprises several segments 7a, 7b, 7c, 7d which are joined by friction welding. Due to the characteristic structure at the weld seams 18, this offers an increased stability. Due to this fact and to the fact that the finished welded shaft then only constitutes one single part, it is possible to design the drive shaft module 11 as described above. In the shown embodiment, the segments 7a, 7b, and 7d are gearwheel segments, while segment 7c is a tube. However, any other types of segments in any sequence and combination are possible. Segment 7a may be e.g., a polygon element, and e.g., 7b may be a splined shaft gearing, or any kind of thread. Equally, any number of tube segments 7c of any length may be provided to correspondingly adapt the axial distance between the other segments to the desired application. Additionally, the segments (7a, 7b, 7c, 7d) may be made of different materials. These may be optimized towards the function of the respective segment and differ with respect to hardness, surface hardness, density, weight, costs or corrosion and oxidation tendencies.

The mounting 10 comprises a bearing arm 19. This permits to arrange the bolting points 13 spaced apart from the axle of the drive shaft 7. This may facilitate assembly. The bearing arm 19 may have an offset, so that the bolting points 13 and the bearing location 9 may also be provided spaced from each other in the axial direction of the drive shaft 7. This may also facilitate assembly in constricted space conditions.

The drive shaft 7 may be designed as a hollow shaft. This facilitates the friction welding procedure. Moreover, the arrangement of a lubrication device 20 within the drive shaft 7 is permitted. This may be, for example, a lubricating nipple or else a system of lubricant lines. If a liquid lubricant is used, the flushing out of abrasion products may be simultaneously provided. However, it is also possible to completely fill the drive shaft 7 with pasty lubricant.

The material conveyor system 3 may be designed such that the drive shaft module 11 may be removed in a removing direction E which in the embodiment extends orthogonally to the conveying direction of the conveyor 6. This is in particular advantageous in the described embodiment of a scraper belt 6. As an alternative, the removing direction E may, however, also extend in any desired angle to the conveying direction of the conveyor 6.

In case of several conveyors 6 being arranged one next to the other, for example two scraper belts 6, it may moreover be advantageous for the removing direction E of the drive shaft module 11 of a conveyor 6 to point into a direction facing away from another conveyor 6.

For each conveyor 6, one or several drive shaft modules 11 may be provided. Equally, for each material conveyor system 3, one or several drive shaft modules 11 may be provided. In the concrete embodiment, the drive shaft module 11 was only described in connection with material conveyor systems. However, it is also possible to provide a corresponding drive shaft module 11 according to the disclosure for driving any other component of the construction machine 1. This would offer the same advantages with respect to assembly, maintenance and replacement.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive shaft module for a material conveyor system of a construction machine, the drive shaft module comprising:
    a drive shaft including different segments that are joined by friction welding; and
    a mounting adapted to mount the drive shaft to the construction machine and comprising a bearing arm, wherein the mounting is connected to the drive shaft at a bearing location such that the entire drive shaft module, comprising the drive shaft and the mounting, may be detachably fixed, in a preassembled state, in or at the construction machine;
    wherein the drive shaft module comprises only one mounting adapted to be mounted to the construction machine.

2. The drive shaft module according to claim 1 wherein the drive shaft module comprises, in addition to the mounting, a device which is configured for a pluggable connection of the drive shaft module with a corresponding disposition of the construction machine.

3. The drive shaft module according to claim 1 wherein the drive shaft is embodied as a hollow shaft.

4. The drive shaft module according to claim 3 further comprising a lubrication device provided within the drive shaft.

5. A material conveyor system for a construction machine that processes or transports bulk material, the material conveyor system comprising:
    a conveyor that is configured to convey the bulk material; and
    a drive shaft module according to claim 1 which is configured to drive the conveyor.

6. The material conveyor system according to claim 5 wherein the drive shaft module is removable orthogonally to a conveying direction of the conveyor.

7. The material conveyor system according to claim 5 wherein the conveyor system includes a plurality of the conveyors and a plurality of the drive shaft modules, and the drive shaft modules are each removable in a removing direction, wherein the removing direction of the drive shaft module for one conveyor points in a direction facing away from another conveyor.

8. The material conveyor system according to claim 5 wherein the conveyor is a scraper belt.

9. The material conveyor system according to claim 6 further comprising a power transmission element designed to drive the drive shaft of the drive shaft module.

10. The material conveyor system according to claim 9 wherein the mounting of the drive shaft module and the power transmission element are associated with the same end of the drive shaft.

11. A construction machine for processing or transporting bulk material, wherein the construction machine comprises a material conveyor system according to claim 5.

12. The construction machine according to claim 11 wherein the construction machine is a road finishing machine or a feeder.

13. The construction machine according to claim 11 wherein the material conveyor system may be employed as transverse conveyor system or as a longitudinal conveyor system.

14. A drive shaft module for a material conveyor system of a construction machine, the drive shaft module comprising:
    a drive shaft including different segments that are joined by friction welding;
    a mounting connected to the drive shaft and comprising a bearing arm, wherein the mounting is adapted to be mounted to the construction machine such that the entire drive shaft module, comprising the drive shaft and the mounting, may be detachably fixed, in a preassembled state, to the construction machine;
    wherein the drive shaft module comprises only one mounting adapted to be mounted to the construction machine.

15. A material conveyor system for a construction machine that processes or transports bulk material, the material conveyor system comprising:
    a plurality of conveyors that are configured to convey the bulk material; and
    a plurality of drive shaft modules configured to drive the conveyors, each drive shaft module comprising a drive shaft including different segments that are joined by friction welding, and a mounting connected to the drive shaft at a bearing location and adapted to mount the drive shaft to the construction machine such that the entire drive shaft module may be detachably fixed, in a preassembled state, in or at the construction machine;
    wherein the drive shaft modules are each configured to be removable in a removing direction, and wherein the removing direction of the drive shaft module for one conveyor points in a direction facing away from another conveyor.

* * * * *